(12) United States Patent
Arnold et al.

(10) Patent No.: US 7,464,284 B2
(45) Date of Patent: Dec. 9, 2008

(54) SYSTEMS AND METHODS FOR DRIVING DATA OVER A BUS WHERE THE SYSTEMS EMPLOY A BUS CLOCK THAT IS DERIVED FROM A SYSTEM CLOCK AND A DATA CLOCK DESIGNED TO LEAD THE BUS CLOCK

(75) Inventors: Barry Joseph Arnold, Fort Collins, CO (US); Nicholas Albert Michell, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 372 days.

(21) Appl. No.: 11/086,027

(22) Filed: Mar. 22, 2005

(65) Prior Publication Data

US 2006/0218317 A1    Sep. 28, 2006

(51) Int. Cl.
*G06F 1/04* (2006.01)
(52) U.S. Cl. .......................... 713/503; 710/58
(58) Field of Classification Search ................. 713/503; 710/58
See application file for complete search history.

(56) References Cited

U.S. PATENT DOCUMENTS

| | | | | |
|---|---|---|---|---|
| 5,369,672 A | * | 11/1994 | Matsumoto | 375/354 |
| 5,495,596 A | * | 2/1996 | Yau | 713/400 |
| 5,600,824 A | * | 2/1997 | Williams et al. | 713/400 |
| 5,634,116 A | * | 5/1997 | Singer | 713/400 |
| 5,754,833 A | * | 5/1998 | Singh et al. | 713/400 |
| 5,867,694 A | * | 2/1999 | Billings et al. | 713/501 |
| 5,987,081 A | * | 11/1999 | Csoppenszky et al. | 375/354 |
| 6,161,189 A | * | 12/2000 | Arimilli et al. | 713/600 |
| 6,584,578 B1 | * | 6/2003 | Faue | 713/503 |
| 6,629,250 B2 | * | 9/2003 | Kopser et al. | 713/401 |
| 6,697,968 B1 | | 2/2004 | Orfali | |
| 6,839,856 B1 | | 1/2005 | Fromm et al. | |
| 7,010,713 B2 | * | 3/2006 | Roth et al. | 713/400 |
| 2003/0210085 A1 | * | 11/2003 | Larsson et al. | 327/211 |
| 2004/0024923 A1 | | 2/2004 | Wygant | |
| 2004/0225910 A1 | * | 11/2004 | Adkisson | 713/400 |

* cited by examiner

*Primary Examiner*—Thomas Lee
*Assistant Examiner*—Vincent T Tran

(57) ABSTRACT

Systems and methods for driving data over a data bus are disclosed. One embodiment of a system may comprise a bus clock signal that is a copy of a system clock signal that controls the timing associated with transferring data over the bus, a data clock signal that is designed to lead the system clock by a portion of a clock cycle to drive data over the bus ahead of the bus clock signal, an output latch device that drives data over the data bus in response to an edge of the data clock signal and a skew corrector that mitigates racing of data over the data bus in the event that the data clock lags the bus clock.

17 Claims, 4 Drawing Sheets

SYSTEMS AND METHODS FOR DRIVING DATA OVER A BUS WHERE THE SYSTEMS EMPLOY A BUS CLOCK THAT IS DERIVED FROM A SYSTEM CLOCK AND A DATA CLOCK DESIGNED TO LEAD THE BUS CLOCK

BACKGROUND

In a shared bus system, multiple bus agents may be coupled to the shared bus. Data transfers are dictated by a system clock that provides timing for receiving and transmitting data across the shared bus between bus agents. Each bus agent generates an internal bus clock that is a replica of the system clock. An associated internal bus clock is employed by a respective agent to drive data to the bus to be received by one or more other bus agents. Additionally, an associated internal bus clock is employed by a respective agent to latch in data received from another respective agent on the shared bus. Therefore, synchronization between internal bus clocks of agents coupled to the shared bus is extremely important for the reliable exchange of data.

However, even if accurate synchronization of the internal bus clocks is achieved, a given agent may drive data over the bus later than other agents due to inherent or intrinsic characteristics associated with the given agent. As bus frequencies increase, this becomes more problematic and can result in data driven from a source agent not reaching a destination agent in time for the destination agent to latch the data (e.g., within a single clock cycle).

DETAILED DESCRIPTION

This disclosure relates generally to systems and methods for driving data over a bus. The systems and methods employ a bus clock that is derived from a system clock and a data clock designed to lead the bus clock. A skew corrector is provided to mitigate racing of the data to the bus in the event that the data clock actually lags the system clock. Racing is defined as providing data onto the bus too early (e.g., about a full clock cycle) for a destination device resulting in incorrect data being on the bus during a clock cycle causing a fatal error.

Figure 1:
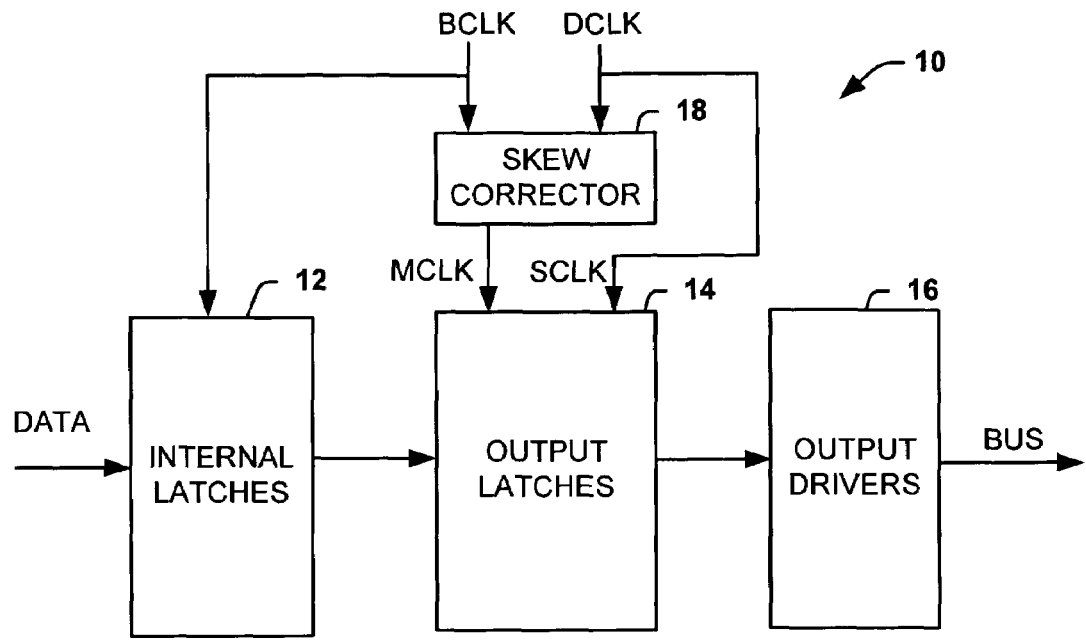
FIG. 1 illustrates a block diagram of an embodiment of a system for driving data over a bus.

FIG. 1 illustrates a system 10 for driving data over a bus. The system 10 can be employed as a drive system of a bus agent that is coupled to a shared bus system (e.g., a front-side bus) having a plurality of additional bus agents coupled to the bus. A given bus agent coupled to the data bus can be one of processor, memory controller, I/O controller, bus controller or a variety of other bus agent devices. Each of the bus agents can generate an internal bus clock that is a copy of a system clock that determines the operating frequency for driving data to the bus and latching in data from the bus. For example, data can be driven on the bus by a source agent at the rising edge of a clock cycle wherein the data needs to be latched in by a destination agent(s) by the end of the clock cycle. The system 10 can be employed in a bus agent that intrinsically drives data to the data bus slower than at least one other bus agent to facilitate synchronization of the transfer of data between the intrinsically slower bus agent and the at least one other bus agent. For example, one bus agent may employ intrinsically slower components than another bus agent due to different manufacturing processes. Additionally, bus agents can have skew between internally generated bus clocks due to intrinsic characteristics associated with the bus agents.

The system 10 includes a set of internal latches 12, a set of output latches 14 and a set of output drivers 16. The internal latches 12 latch data to the output latches based on a bus clock (BCLK), which is an internally generated clock that is a copy or replica of the system clock. The output latches 14 latch the data received from the internal latches 12 to output drivers 16, which drive the data over the bus. The output latches 14 latch the data to the output drivers 16 based on both a bus clock signal (BCLK) and an internally generated data clock signal (DCLK). The data clock signal and the bus clock signal are designed to have substantially the same frequency. The data clock signal is designed to lead the bus clock signal to drive the data from the output latches 14 through the output drivers 16 earlier than the rising edge of the bus clock signal. This mitigates delay associated with intrinsic characteristics of the system 10 in driving the data over the bus to be captured by a destination device within a single clock cycle of the bus clock.

However, since both the data clock and the bus clock are generated internally, for example, employing different phase locked loop (PLLs) devices, a skew between the bus clock and the data clock can arise. As a result the data clock may actually lag the bus clock. The system 10 employs a skew corrector 18 that assures that the master devices associated with the output latches 14 are not transparent until both the bus clock and data clock are in a same predetermined state (e.g., a low state). The skew corrector 18 generates a master clock (MCLK) that is a function of the bus clock and the data clock. The master clock controls the passing of data from the internal latches 12 to the master devices of the output latches 14. Therefore, regardless of whether the data clock leads or lags the bus clock, the data will not be passed from the internal latches 12 through the master devices to the slave devices of the output latches 14, until both the bus clock and the data clock are in, for example, a low state. The data is passed through the slave devices of the output latches 14 through the output drivers 16 to the bus on a rising edge of the data clock. The data clock is the slave clock (SLCK) for the slave devices of the output latches 14. The skew corrector 18 mitigates racing of the data to the bus without adding additional delay. The skew corrector 18 also compensates for the compressed cycle time caused from the data clock taking too much of the cycle time from the bus clock during passing of the data from the input latches 12 to the bus.

Figure 2:
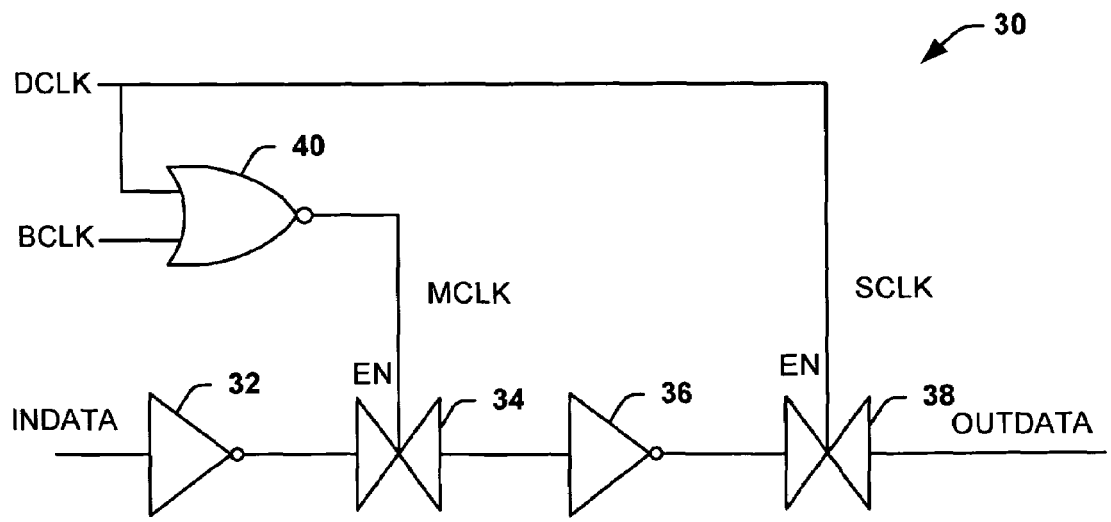
FIG. 2 illustrates a schematic diagram of an embodiment of an output latch device.

FIG. 2 illustrates an embodiment of an output latch device 30. The output latch device 30 is a master-slave flip flop. A master-portion of the master-slave flip flop includes a first inverter 32 and a first transfer gate 34. A slave portion of the master-slave flip flop includes a second inverter 36 and a second transfer gate 38. The first and second transfer gates 34 and 38 can be formed from a n-type field effect transistor (NFET) and a p-type (PFET) coupled together. The first and second transfer gates 34 and 38 include enable lines in which the transfer gate is transparent allowing data to pass through the transfer gate when a respective enable line is in a high state, and opaque preventing data to pass through the transfer gate when a respective enable line is in a low state. A data clock (DCLK) and a bus clock (BCLK) are employed to latch input data to an output of the output latch device 30. The data clock is designed to lead the bus clock by a portion of a clock cycle (e.g., ⅛ clock cycle, ¼ clock cycle). The output latch device 30 includes a NOR gate 40 that provides skew correction in the event that the data clock lags the bus clock by a portion of a clock cycle.

As illustrated in FIG. 2, the data clock is provided to the enable line of the second transfer gate 38 and operates as the slave clock (SCLK). The data clock and the bus clock are provided as inputs to the NOR gate 40. The output of the NOR gate 40 is provided to the enable line of the first transfer gate 34 and operates as the master clock (MCLK). The data provided to the first gate through the first inverter 32 does not pass through the first transfer gate 34 until both the bus clock and the data clock are in a low state. Therefore, regardless of whether the data clock lags or leads the bus clock, the input data does not pass through the first transfer gate 34 of master portion, until both the bus clock and the data clock are in a low state. The data held in the master portion passes through the second pass gate 38 of the slave portion through the second inverter 36 on the next rising edge of the data clock. Therefore, the data clock controls the driving of the data output from the master-slave flip flop or latch output device 30 through a driver (not shown) over the bus.

Figure 3:
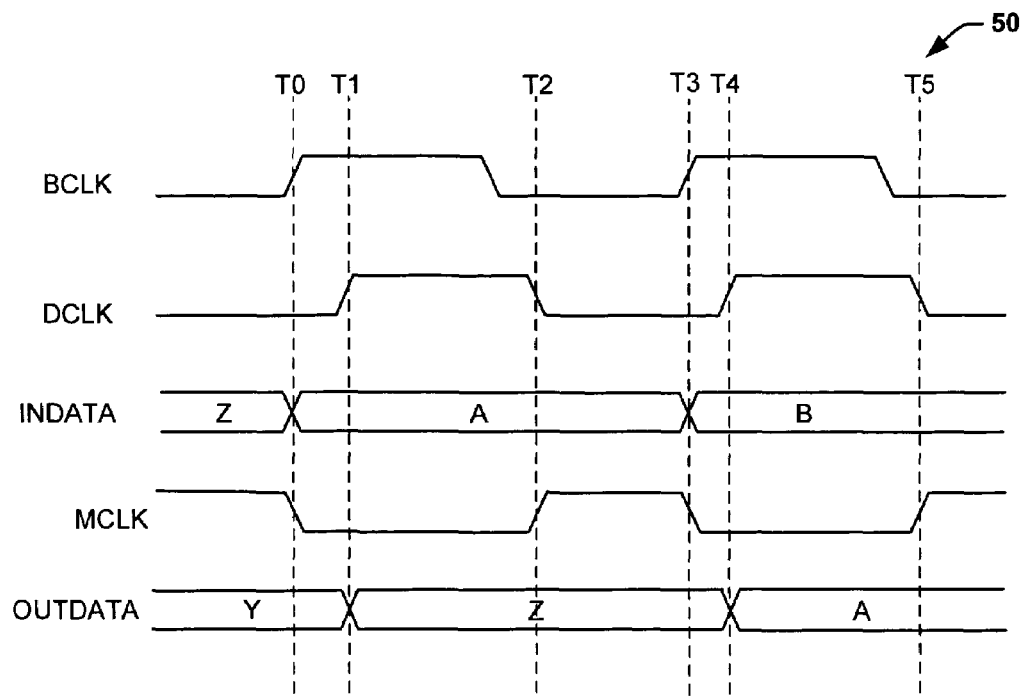
FIG. 3 illustrates an embodiment a timing diagram that illustrates the timing signals associated with transferring data through output latches in the event that the data clock lags the bus clock.

FIG. 3 is a timing diagram 50 that illustrates the timing signals associated with transferring data through output latches in the event that the data clock lags the bus clock. The timing signals associated with the timing diagram can be discussed with respect to latching data through the output latch illustrated in FIG. 2. At a time T0, the bus clock rises from a low state to a high state providing data A to the input of the master portion of the output latch from an internal latch. At this time data Z is at the input of the slave portion of the output latch, while data Y has been driven to the bus. The master clock falls from a high state to a low state, since one of the bus clock and the data clock are in a high state. At a time T1, the data clock rises from a low state to a high state driving data Z from the slave portion of the output latch to the bus. At time T2, the bus clock has already fallen from a high state to a low state, and the data clock falls from a high state to a low state. Therefore, both the bus clock and the data clock are in a low state causing the master clock to rise from a low state to a high state passing data A through the master portion of the output latch to the slave portion of the output latch.

At a time T3, the bus clock rises from a low state to a high state providing data B to the input of the master portion of the output latch from an internal latch. At a time T4, the data clock rises from a low state to a high state driving data A from the slave portion of the output latch to the bus. At time T5, the bus clock has already fallen from a high state to a low state, and the data clock falls from a high state to a low state. Therefore, both the bus clock and the data clock are in a low state causing the master clock to rise from a low state to a high-state passing data B through the master portion of the output latch to the slave portion of the output latch. The above process repeats in a pipelined manner.

Figure 4:
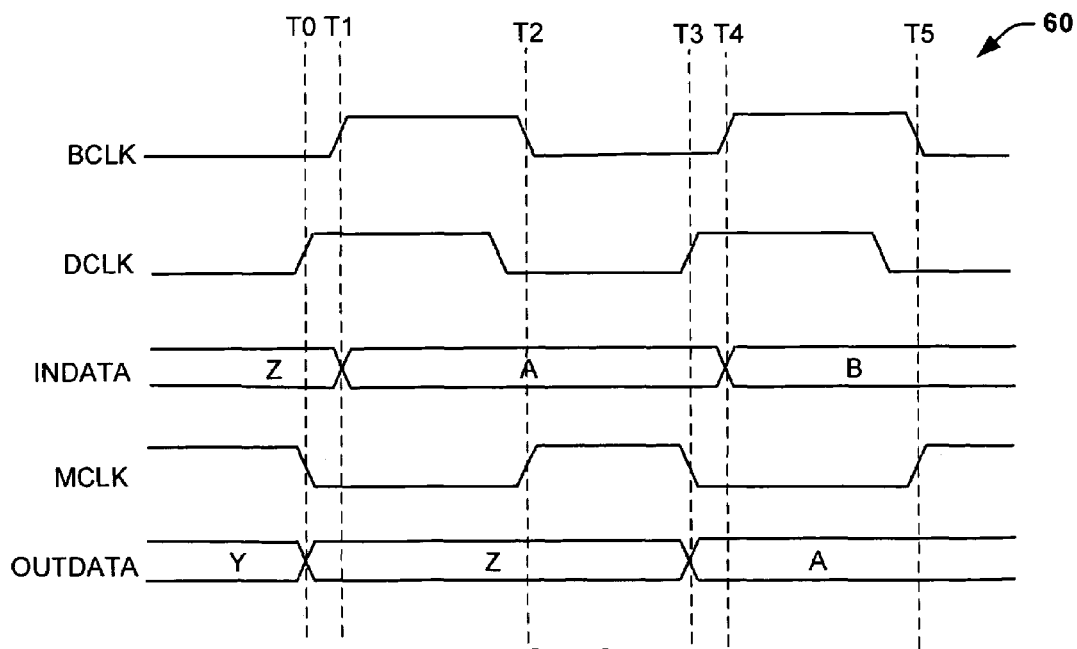
FIG. 4 illustrates an embodiment a timing diagram that illustrates the timing signals associated with transferring data through output latches in the event that the data clock leads the bus clock.

FIG. 4 is a timing diagram 60 that illustrates the timing signals associated with transferring data through output latches in the event that the data clock leads the bus clock. The timing signals associated with the timing diagram can be discussed with respect to latching data through the output latch illustrated in FIG. 2. At a time T0, the data clock rises from a low state to a high state driving data Z from the slave portion of the output latch to the bus. At this time data Z is also at the input of the master portion of the output latch. The master clock falls from a high state to a low state, since one of the bus clock and the data clock are in a high state. At a time T1, the bus clock rises from a low state to a high state driving data A to the input of the master portion of the output latch from an internal latch device. At time T2, the data clock has already fallen from a high state to a low state, and the bus clock falls from a high state to a low state. Therefore, both the bus clock and the data clock are in a low state causing the master clock to rise from a low state to a high state passing data A through the master portion of the output latch to the slave portion of the output latch.

At a time T3, the data clock rises from a low state to a high state driving data A from the slave portion of the output latch to the bus and causing the master clock to fall from a high state to a low state. At a time T4, the bus clock rises from a low state to a high state providing data B at the input of the master portion of the output latch from an internal latch device. At time T5, the data clock has already fallen from a high state to a low state, and the bus clock falls from a high state to a low state. Therefore, both the bus clock and the data clock are in a low state causing the master clock to rise from a low state to a high state, passing data B through the master portion of the output latch to the slave portion of the output latch. The above process repeats in a pipelined manner.

Figure 5:
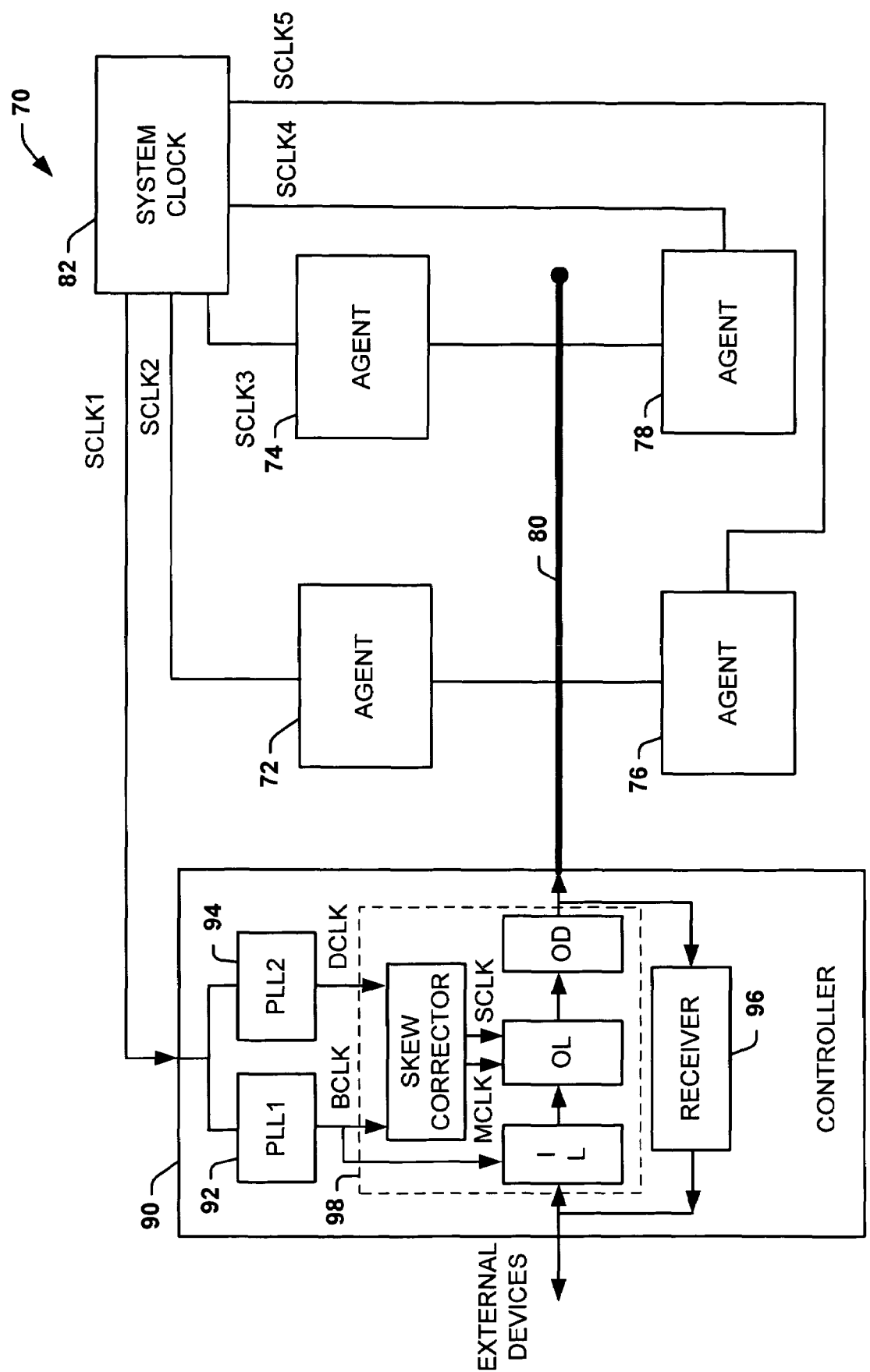
FIG. 5 illustrates an embodiment of multiple agent system having a shared bus.

FIG. 5 illustrates a multiple agent system 70 having a shared bus 80. The multiple agent system 70 can be, for example, a multi-processor system. The multiple agent system includes a plurality of agents 72, 74, 76 and 78 coupled to the shared bus 80. The plurality of agents 72, 74, 76 and 78 can be processors or other type of bus agents coupled to the bus. The multiple agent system 70 includes a controller 90, such as an I/O controller, a bus controller, a memory controller or any combination thereof. In the example of FIG. 5, the controller 90 intrinsically drives data to the bus slower than at least one other bus agent. Therefore, the controller 90 employs a drive system 98 that facilitate synchronization of the transfer of data between the intrinsically slower controller 90 and the at least one other bus agent. The multiple agent system 70 includes a system clock 82 that provides each agent of the multiple agents with a matched copy (SCLK1-SCLK5) of the system clock 82. Each of the bus agents can generate an internal bus clock that is a copy of the system clock that determines the operating frequency for driving data to the bus 80 and latching in data from the bus 80.

The drive system 98 drives data over the bus 80 to one or more of the plurality of agents 72, 74, 76 and 78 coupled to the bus 80. The controller 90 also includes a receiver 96 for latching data from one or more of the plurality of the agents 72, 74, 76 and 78 and transferring that data to one or more external devices. The controller 90 includes a first phase locked loop (PLL) 92 that generates an internal bus clock (BCLK) that is a copy of the system clock (SCLK1). The controller 90 includes a second PLL 94 that generates a data clock (DCLK) that is designed to lead the bus clock by a portion of a clock cycle. The drive system 98 includes a set of internal latches, a set of output latches and a set of output drivers. The internal latches latch data to the output latches based on the bus clock and the output latches latch the data received from the internal latches to output drivers, which drive the data over the bus. The output latches latch the data to the output drivers based on both the bus clock and the data clock signal.

The drive system 98 employs a skew corrector that assures that the master devices associated with the output latches are not transparent until both the bus clock and data clock are in a same predetermined state, such as a low state. The skew corrector generates a master clock from the bus clock and the data clock, and a slave clock from the data clock. Therefore, regardless of whether the data clock leads or lags the bus clock, the data will not be passed from the internal latches through the master devices of the output latches, until both the bus clock and the data clock are in a low state. The data is passed through the slave devices of the output latches through the output drivers to the bus on a rising edge of the data clock. The skew corrector mitigates racing of the data to the bus.

Figure 6:
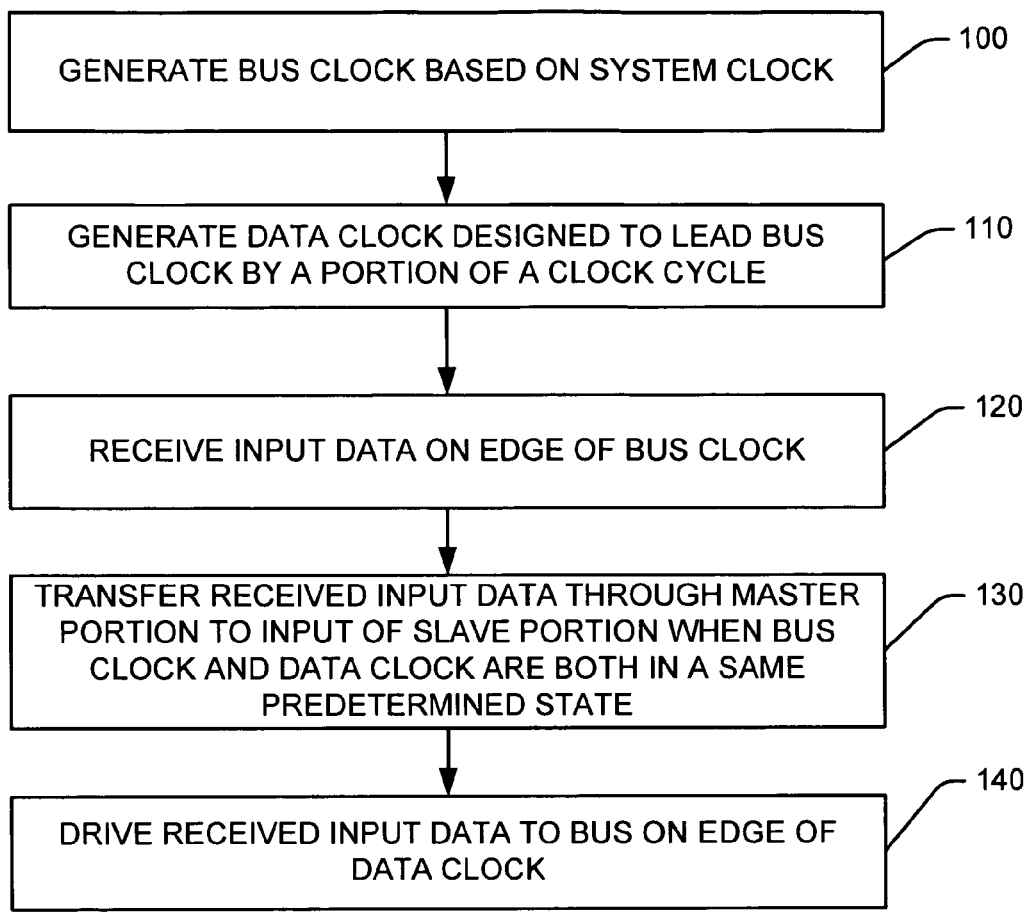
FIG. 6 illustrates an embodiment of a methodology for driving data over a bus.

In view of the foregoing structural and functional features described above, certain methods will be better appreciated with reference to FIGS. 5-6. It is to be understood and appreciated that the illustrated actions, in other embodiments, may occur in different orders and/or concurrently with other actions. Moreover, not all illustrated features may be required to implement a method.

FIG. 6 illustrates a methodology for driving data over a data bus. The methodology can be employed, for example, in a bus agent coupled to a shared bus in which the bus agent is intrinsically slower at driving data over the data bus than at least one other agent. The methodology begins at 100, where a bus clock is generated based on a system clock. The bus clock is designed to be a matched copy or replica of the system clock. At 110, a data clock is generated that is designed to lead the bus clock by a portion of a clock cycle. The data clock and the bus clock are designed to have substantially the same frequency. At 120, input data is received at an edge of the bus clock by an output latch device. The input data can be received from an internal latch device, for example, at a rising edge of the bus clock. At 130, the input data is transferred through a master portion to an input of a slave portion of the output latch device when the bus clock and the data clock are both in a same predetermined state. For example, a same predetermined state can be a low state or a high state. The methodology then proceeds to 140. At 140, the input data is driven through the slave portion of the output latch over the bus on an edge of the data clock. The edge of the data clock can be, for example, a rising edge of the data clock.

Figure 7:
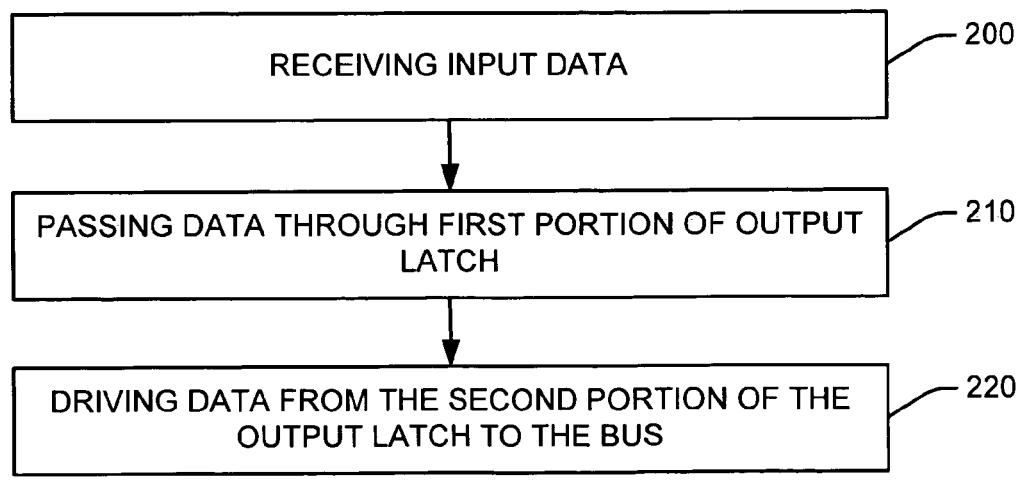
FIG. 7 illustrates another embodiment of methodology for driving data over a bus.

FIG. 7 illustrates another methodology for driving data over a bus. At 200, input data is received on an edge of a bus clock that matches a system clock. At 210, the data is passed through a first portion to a second portion of an output latch when the bus clock and a data clock are in a same predetermined state. The data clock is designed to lead the bus clock. At 220, the data is driven from the second portion of the output latch to the bus on an edge of the data clock.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for driving data over a data bus, the system comprising:

a bus clock signal that is a copy of a system clock signal that controls the timing associated with transferring data over the bus;

a data clock signal that is designed to lead the system clock by a portion of a clock cycle to drive data over the bus ahead of the bus clock signal;

an output latch device that drives data over the data bus in response to an edge of the data clock signal; and a skew corrector that mitigates racing of data over the data bus in the event that the data clock lags the bus clock;

wherein the output latch device includes a plurality of master-slave latches, each having a master portion and a slave portion, the skew corrector generating a master clock that allows data to pass from an input of the master portion to an input of the slave portion in response to both the bus clock signal and the data clock signal being provided in a same predetermined state, the master clock blocking the data from passing from the master portion to the slave portion in response to the bus clock signal and the data clock signal being provided in different states, and the slave portion driving data over the data bus in response to an edge of the data clock signal.

2. The system of claim 1, wherein the skew corrector is at least one NOR gate that receives the data clock signal as a first input signal and the bus clock signal as a second input signal and generates the master clock based on the states of the bus clock signal and the data clock signal.

3. The system of claim 1, wherein the master portion comprises a first transfer gate having an enable line coupled to the master clock and the slave portion comprises a second transfer gate having an enable line coupled to the data clock signal.

4. The system of claim 1, further comprising an internal latch device that receives data and provides data to the output latch device based on an edge of the bus clock signal.

5. The system of claim 1, further comprising a plurality of output drivers that receive data from the output latch device and drive the data over the bus.

6. A bus agent comprising the system of claim 1, wherein the bus agent intrinsically drives data over the bus slower than at least one other bus agent coupled to the bus.

7. The system of claim 1, wherein the bus clock signal and the data clock signal have substantially the same frequency.

8. A bus agent for coupling to a shared bus wherein the bus agent is intrinsically slower at driving data over the bus than at least one other bus agent, the bus agent having a driving system comprising:

a plurality of internal latches operative to receive data and output the data based on an edge of a bus clock designed to match a system clock that controls the timing associated with transferring data over the bus;

a plurality of output latches operative to receive data from the plurality of internal latches and output the data based on an edge of a data clock designed to lead the bus clock by a portion of a clock cycle; and a skew corrector that controls the transfer of data through the plurality of output latches to mitigate racing of data over the data bus in the event that the data clock lags the bus clock;

wherein the plurality of output latches comprise a plurality of master-slave latches, each having a master portion and a slave portion, the skew corrector generating a master clock that allows data to pass from an input of the master portion to an input of the slave portion in response to both the bus clock signal and the data clock signal being in a same predetermined state, the master clock blocking the data from passing from the master portion to the slave portion in response to the bus clock signal and the data clock signal being provided in different states, and the slave portion driving data over the data bus in response to an edge of the data clock signal.

9. The bus agent of claim 8, wherein the skew corrector is at least one NOR gate that receives the data clock as a first input signal and the bus clock as a second input signal and generates the master clock based on the states of the bus clock and the data clock.

10. The bus agent of claim 8, wherein the master portion comprises a first transfer gate having an enable line coupled to the master clock and the slave portion comprises a second transfer gate having an enable line coupled to the data clock.

11. The bus agent of claim 8, further comprising a plurality of output drivers that receive data from the plurality of output latches and drive the data over the bus.

12. The bus agent of claim 8, further comprising a first phase locked loop (PLL) that generates the bus clock to match the system clock and a second PLL that generated the data clock to lead the system clock.

13. The bus agent of claim 8, being at least one of an input/output (I/O) controller, a bus controller, a memory controller and a processor.

14. A system for driving data over a bus to compensate for an intrinsically slower bus agent, the system comprising:
 means for generating a bus clock that matches a system clock;
 means for generating a data clock that leads the system clock;
 means for driving data over a bus a portion of a clock cycle ahead of the system clock; and
 means for mitigating skew in the event that the means for driving data drives data a portion of a clock cycle behind the system clock, wherein the means for mitigating skew allows the data to be driven over the data bus in response to the bus clock and the data clock being in a same predetermined state, and blocking the data from being driven over the data bus in response to the bus clock and the data clock being in different states.

15. A method for driving data over a bus, the method comprising:
 receiving input data on an edge of a bus clock that matches a system clock;
 passing data through a first portion to a second portion of an output latch in response to the bus clock and a data clock being in a same predetermined state, the data clock designed to lead the bus clock;
 holding data at the first portion of the output latch in response to the bus clock and the data clock being in different states; and
 driving the data from the second portion of the output latch to the bus on an edge of the data clock.

16. The method of claim 15, further comprising:
 performing a logical NOR operation on the bus clock and data clock to generate a master clock that enables the first portion of the output latch when the bus clock and the data clock are in the same predetermined state, the master clock mitigating racing of data over the data bus in the event that the data clock lags the bus clock.

17. The method of claim 15, wherein the edge of the bus clock and the edge of the data clock are the rising edge of the bus clock and the rising edge of the data clock, and the same predetermined state is a low state.

* * * * *